(12) United States Patent
Alim et al.

(10) Patent No.: US 11,170,420 B2
(45) Date of Patent: Nov. 9, 2021

(54) COMPUTER SYSTEMS FOR PEER-TO-PEER ONBOARDING TO AN ONLINE MARKETPLACE

(71) Applicant: Chaldal, Inc., San Francisco, CA (US)

(72) Inventors: Waseem Alim, Dacca (BD); Tejas Viswanath, Foster City, CA (US); Zia Ashraf, Dacca (BD)

(73) Assignee: Chaldal, Inc., San Francisco, CA (US)

( * ) Notice: Subject to any disclaimer, the term of this patent is extended or adjusted under 35 U.S.C. 154(b) by 47 days.

(21) Appl. No.: 16/421,714

(22) Filed: May 24, 2019

(65) Prior Publication Data

US 2019/0362399 A1    Nov. 28, 2019

Related U.S. Application Data

(60) Provisional application No. 62/676,237, filed on May 24, 2018.

(51) Int. Cl.
*G06Q 30/00* (2012.01)
*G06Q 30/06* (2012.01)

(52) U.S. Cl.
CPC ..... *G06Q 30/0617* (2013.01); *G06Q 30/0609* (2013.01); *G06Q 30/0641* (2013.01)

(58) Field of Classification Search
CPC ........... G06Q 30/0617; G06Q 30/0609; G06Q 30/0641
See application file for complete search history.

(56) References Cited

U.S. PATENT DOCUMENTS

| 10,929,866 | B1* | 2/2021 | Qi | G06Q 30/0229 |
| 2011/0054989 | A1* | 3/2011 | Burton | G06Q 30/02 |
| | | | | 705/14.16 |
| 2012/0316996 | A1* | 12/2012 | Shin | G06Q 30/06 |
| | | | | 705/27.1 |
| 2019/0080404 | A1* | 3/2019 | Molinari | G06Q 20/223 |
| 2019/0295350 | A1* | 9/2019 | Wegelin | G07C 9/00912 |

OTHER PUBLICATIONS

Chaudhary, Neha, and Vivek Kumar Sehgal. "YELO: the marketplace provider." (2019).*

* cited by examiner

*Primary Examiner* — Kathleen Palavecino
(74) *Attorney, Agent, or Firm* — Cognition IP, P.C.; Edward Steakley

(57) ABSTRACT

A system and method may be provided for more efficient onboarding of entities to a marketplace. An existing entity in the marketplace may agree to become an agent of the owner of the marketplace. A request may be received from a new entity wishing to join the marketplace. The system and method may assign the existing entity to onboard the new entity. A digital image may be received of the existing entity and new entity and optional documentation of the new entity's credentials. The system may digitally link the first seller and second seller so that the first seller may receive a portion of the transaction values collected by the second seller going forward.

20 Claims, 5 Drawing Sheets

COMPUTER SYSTEMS FOR PEER-TO-PEER ONBOARDING TO AN ONLINE MARKETPLACE

CROSS-REFERENCE TO RELATED APPLICATIONS

This application claims the benefit of U.S. Provisional Patent Application No. 62/676,237, filed May 24, 2018, which is hereby incorporated by reference in its entirety.

FIELD OF THE INVENTION

The invention relates generally to methods of onboarding users to an online marketplace.

BACKGROUND

Online marketplaces allow connecting consumers with producers. Value is created as producers are able to sell goods or service to consumers more quickly and easily through the online marketplace. Online marketplaces may be accessed through computer systems such as desktops, laptops, smartphones, and mobile devices.

One of the challenges of online marketplaces is onboarding new users, both on the consumer and producer side of the market. It is particularly challenging when the online marketplace requires that users be verified, such as by checking identifications, bank accounts, or other background information. Using existing methods, the online marketplace owner may need to hire many agents and operators to verify users.

It would be desirable to provide a software and hardware system that would enable peer-to-peer onboarding and verification in an online marketplace.

SUMMARY OF THE INVENTION

Embodiments relate to an online marketplace of consumers and sellers, where users may onboard other users. In some embodiments, sellers on the marketplace may onboard other sellers. In other embodiments, consumers on the marketplace may onboard other consumers.

In one embodiment, user interface elements are displayed prompting a first seller to agree to become an agent of the owner of the online marketplace. An acceptance is received from the first seller to become an agent of the owner of the online marketplace. User interface elements may be displayed to allow a user to request to become a seller on the online marketplace. A request may be received from a second seller to join the online marketplace. The first seller may be assigned to onboard the second seller to the online marketplace. A verification process may be initiated to verify the second seller's credentials. During verification, a digital image may be received of the first seller and second seller and optional documentation of the second seller's credentials. Verification may be performed on the digital image and the second seller added to the online marketplace. The system may digitally link the first seller and second seller so that the first seller may receive a portion of the transaction values collected by the second seller going forward.

DETAILED DESCRIPTION

Figure 1:
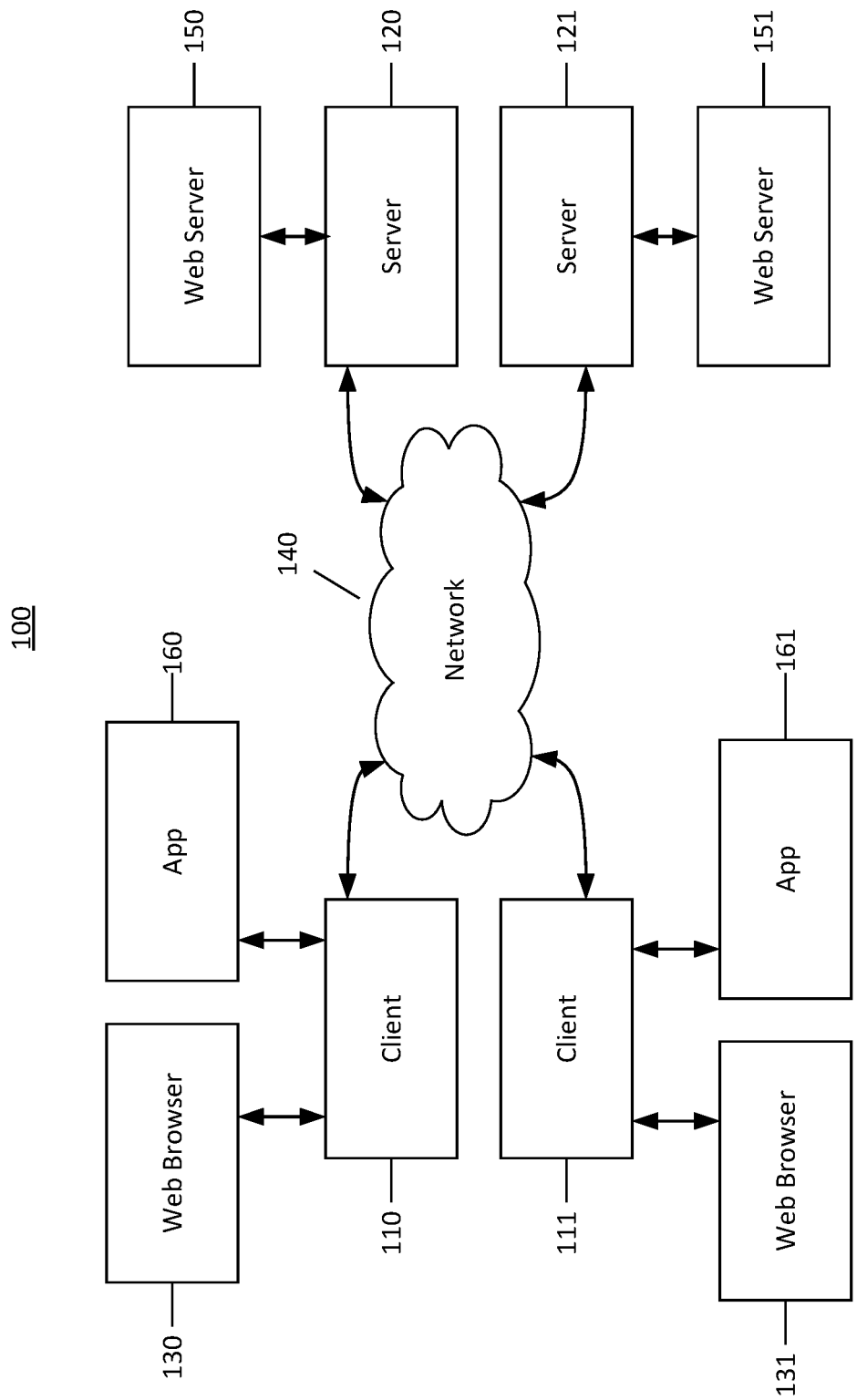
FIG. 1 illustrates an exemplary network environment where some embodiments of the invention may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

FIG. 1 illustrates an exemplary network environment 100 where some embodiments of the invention may operate. The network environment 100 may include multiple clients 110, 111 connected to one or more servers 120, 121 via a network 140. Network 140 may include a local area network (LAN), a wide area network (WAN), a telephone network, such as the Public Switched Telephone Network (PSTN), an intranet, the Internet, or a combination of networks. Two clients 110, 111 and two servers 120, 121 have been illustrated for simplicity, though in practice there may be more or fewer clients and servers. Clients and servers may be computer systems of any type. In some cases, clients may act as servers and servers may act as clients. Clients and servers may be implemented as a number of networked computer devices, though they are illustrated as a single entity. Clients may operate web browsers 130, 131, respectively for display web pages, websites, and other content on the World Wide Web (WWW). Clients may also operate apps 160, 161 that may access content on the network 140, such as the Web. Servers may operate web servers 150, 151, respectively for serving content over the network 140, such as the Web.

Figure 2:
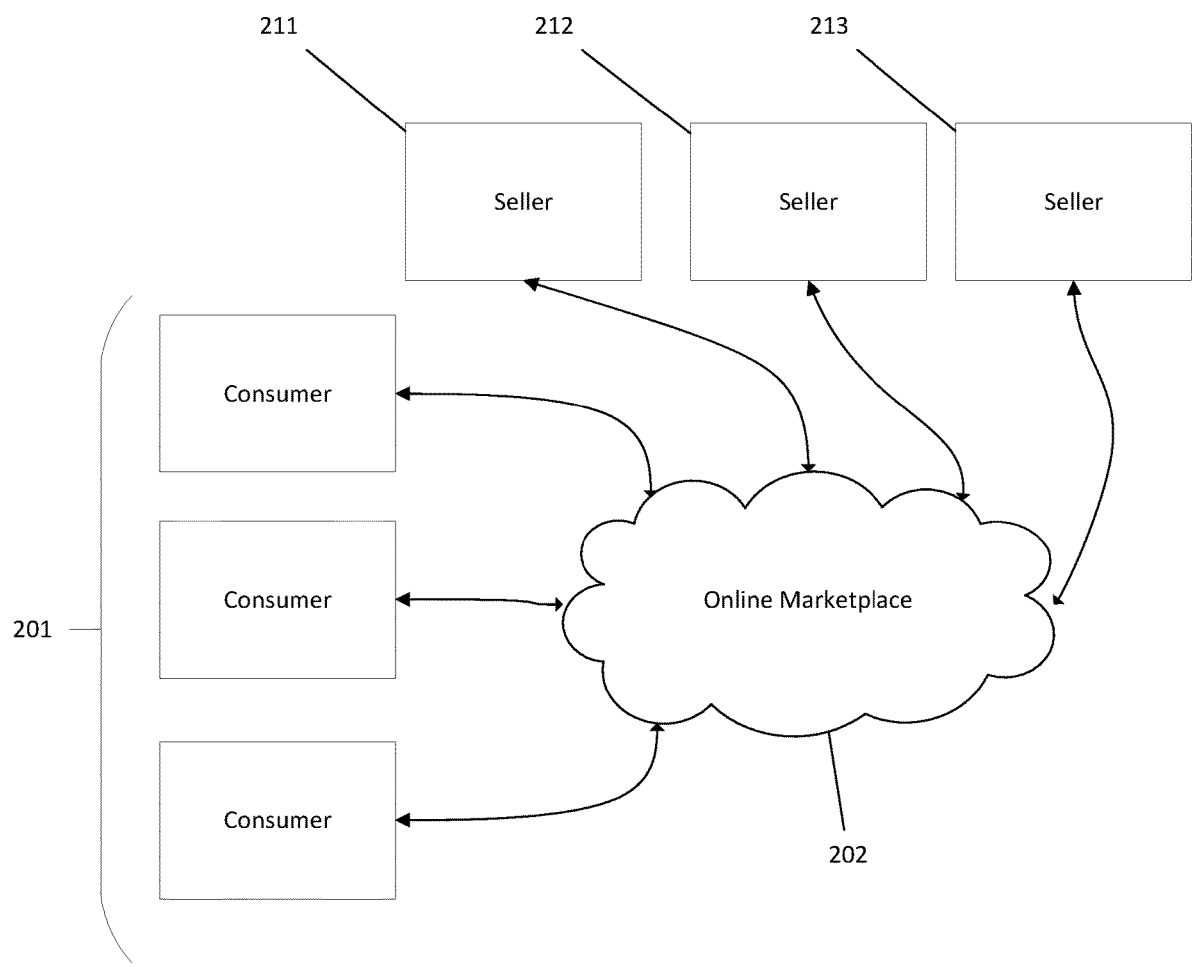
FIG. 2 illustrates an exemplary online marketplace with consumers and sellers.

FIG. 2 illustrates an exemplary online marketplace 202 where some embodiments may operate. The online marketplace 202 may have consumers 201 and sellers 211, 212, and 213. Although only three consumers and three sellers are illustrated, more or fewer consumers and sellers may be on the online marketplace 202. Sellers may sell goods or services to the consumers 201 through the online marketplace. The online marketplace may optionally provide functionality such as billing, shipping and delivery, and other features. Both consumers and sellers may access the online network through client devices such as clients 110, 111. The online marketplace may be implemented and served by servers 120, 121. In one embodiment, the online marketplace is a marketplace for on-demand ridesharing using, for example, cars, motorcycles, motorbikes, scooters, or other vehicles, where the sellers are drivers and the consumers are users looking for a ride from a starting destination to an ending destination.

In some embodiments, users, such as consumers 201 or sellers 211, 212, and 213 must be onboarded to the online marketplace 202. This may include receiving user information such as name, email address, phone number, or other information. It may also include verifying the user, such as by verifying their driver's license, government identification, bank accounts, credit card information, or other information. Verification may be necessary to protect the integrity of the market and ensure that users are who they represent themselves to be. For example, in some embodiments, the online marketplace may require producers to verify their identity before allowing them to sell goods or services on the marketplace. Moreover, in some embodiments, the online marketplace may require producers to verify that they have the appropriate business licenses allowing them to sell the specific goods and services before allowing them on the marketplace.

While traditional methods have involved direct onboarding by the owner of the online marketplace 202, some novel methods herein relate to onboarding using a peer-to-peer method. The peer-to-peer method may be used by producers to onboard other producers or for consumers to onboard other consumers.

Figure 3A:
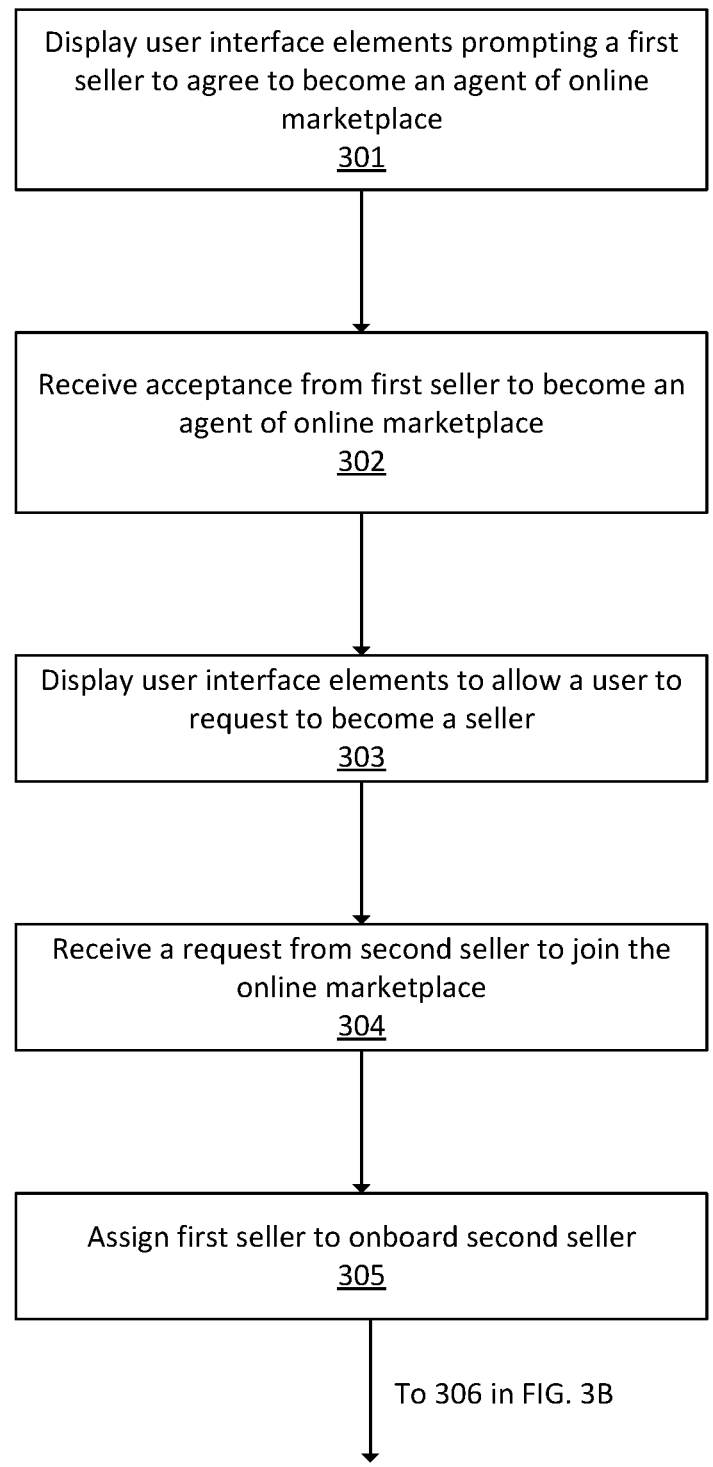
FIGS. 3A-B illustrate an exemplary method that may be performed herein for peer-to-peer onboarding in an online marketplace.
Figure 3B:
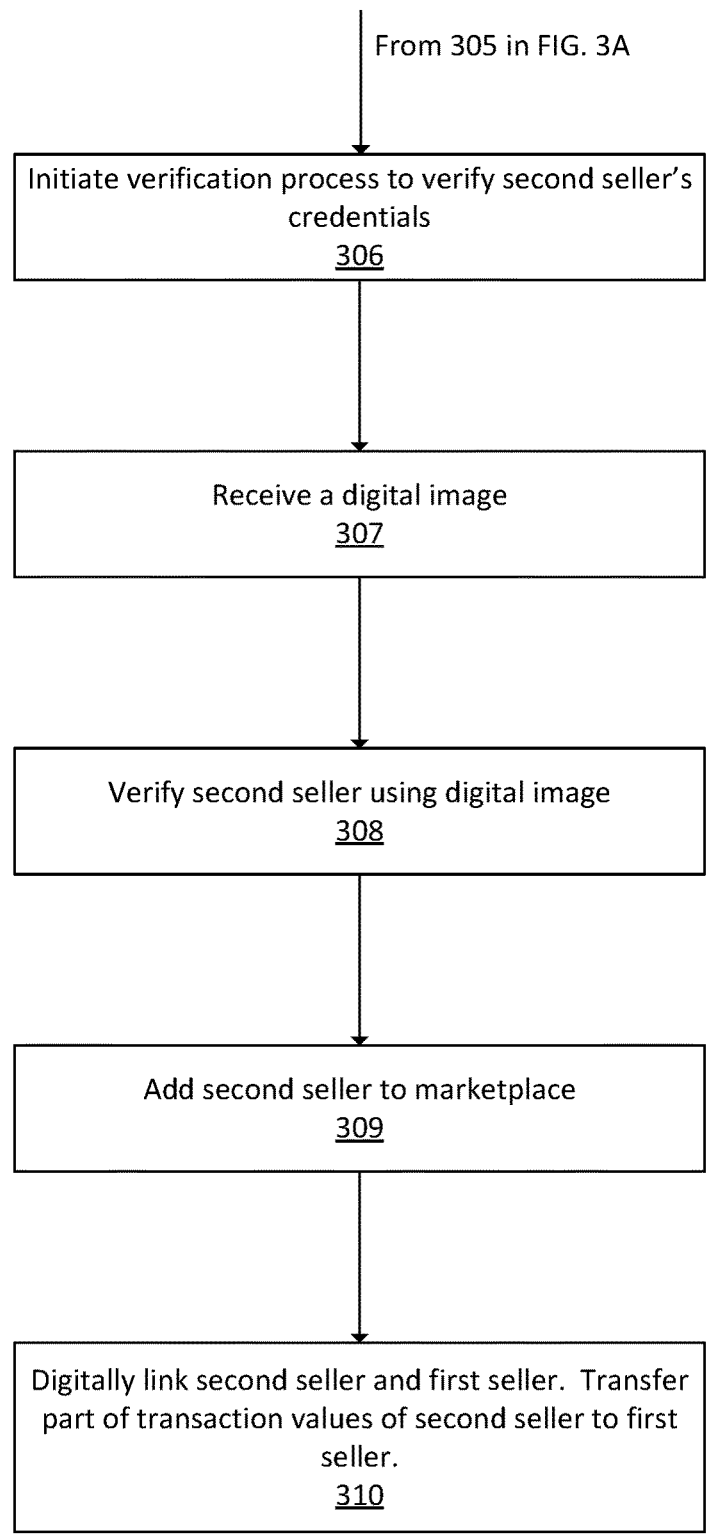

FIGS. 3A-3B illustrate an exemplary method 300 for peer-to-peer onboarding in an online marketplace. Method 300 may take place in an online marketplace having sellers and consumers. The online marketplace may implemented by code in a web server, such as web servers 150, 151. The online marketplace may be presented to users through apps 160, 161 or web browsers 130, 131. The online marketplace may be accessed by a variety of computer systems, such as desktops, laptops, tablets, smartphones, mobile devices, smart devices, and other systems.

In step 301, a first client device may display user interface elements to a first seller on the online marketplace, where the user interface elements prompt the first seller to become an agent of the owner of the online marketplace. The first client device may display instructions to the first seller about how to become an agent of the owner of the online marketplace and what responsibilities are entailed. The client device may also display user interface elements to the first seller that allow the first seller to accept or decline to become an agent of the owner of the online marketplace, such as by accepting or rejecting an electronic contract.

In step 302, the first client device may receive an acceptance from the first seller to become an agent of the online marketplace through displayed interface elements. The first client device may transmit this acceptance to a remote server that stores the acceptance of the first seller.

In step 303, a second client device may display user interface elements allowing a user to request becoming a seller. Through these user interface elements, the second client device may receive a request from a second seller to join the online marketplace (step 304). The second client device may transmit this request to the remote server.

In step 305, the remote server may then assign a seller to onboard the second seller. For example, the remote server may assign the first seller to onboard the second seller. In some embodiments, the second client device may display options to the second seller of which existing sellers are available to perform onboarding. The second seller may then choose a seller to perform onboarding. Various data may be displayed to help with the decision process, such as location of the existing sellers. In other embodiments, the system may select an existing seller to perform the onboarding based on an algorithm that optimizes various criteria, such as location, availability, seniority, existing seller requests to be involved not be involved with onboarding, and so on.

In step 306, a verification process is initiated to verify the second seller's credentials. In some embodiments, the verification process is performed by displaying a verification protocol on the first client device to the first seller and receiving user inputs in the first client device from the first seller that the first seller has verified the second seller's credentials and receiving a digital image to verify that the first seller and second seller were in the same location and were present with the verification documentation. The first client device may transmit an indication to the remote server that the it has received inputs from the first seller that verification was performed and may also transmit to the remote server the digital image with the verification information.

In step 307, in one embodiment, user interface elements may be presented that prompt the first seller to take a photograph with the first seller, second seller, and, optionally, documents to verify the second seller's credentials. The documents may be, for example, a driver's license or government identification. User interface elements may be displayed for taking a digital photograph. In response to receiving a capture photo input request, a digital photograph is captured. The digital image may contain the first seller, the second seller, and, optionally, the documents for verifying the second seller's credentials. The digital image may also be geotagged with location information to indicate where it was taken. The location information may provide additional proof that the first seller and second seller were in the same physical location, which is evidence that the first seller performed the verification process.

The use of documents in the digital image is optional. In some embodiments, it is sufficient that the digital image contain the first seller and second seller to verify that the two sellers were in the same location and that, therefore, the first seller would be able to verify the second seller.

Moreover, in some embodiments, the digital image must include more than one piece of documentation. For example, in some embodiments, both a driver's license and a bank account statement may be required.

In step 308, once the server has received the digital image, the server may assign a task to a human worker or artificial intelligence system to verify that the digital image contains the first seller, the second seller, and, optionally, the documentation of the second seller's credentials. The digital may then be verified to determine that the first seller, second seller, and documentation of the second seller's credentials are present.

Alternatively, rather than checking that the first seller and second seller are in the same photograph, geolocation and time information from a mobile device of a first seller and second seller may be compared with geolocation information and time information of the digital image to ensure that the first seller and second seller were both in the same location where the digital image was taken, at the time that the digital image was taken. This may serve to verify the second seller's credentials.

In step 309, the second seller may be added to the online marketplace.

In step 310, the remote server may store a digital link between the second seller and the first seller to indicate that the second seller was onboarded by the first seller. In future transactions of the second seller, a portion of the value of the transactions may be transmitted to an account of the first seller. This serves to provide an incentive to users to onboard other users. Moreover, part of the value of transactions completed by additional sellers onboarded by the second seller may also be passed on to the first seller. Likewise, a portion of the value of transactions from further sellers onboarded by those sellers may also be transmitted to the first seller. This creates a large incentive for early adopters who onboard many other users early in the lifecycle of the online marketplace.

In some embodiments, further sellers may be onboarded by downstream sellers, such as the second seller, and a portion of the value collected in those transactions may be transferred to the first seller. For example, a third seller may be added to the online marketplace after being onboarded by the second seller. The remote server may store a digital link between the third seller and the second seller and transmit a portion of the value of one or more transactions completed by the third seller to an account of the second seller, and also transmit a portion of the value of transactions completed by the third seller to an account of the first seller.

In another embodiment, a fourth seller may be added to the online marketplace after being onboarded by the third seller. The remote server may store a digital link between the fourth seller and the third seller and transmit a portion of the value of transactions completed by the fourth seller to an account of the third seller, transmit a portion of the value of transactions completed by the fourth seller to an account of the second seller, and transmit a portion of the value of the transactions completed by the fourth seller to an account of the first seller.

While method 300 was illustrated using sellers onboarding other sellers, the same method may also be used by consumers to onboard other consumers. The same steps would apply but each reference to seller would be replaced by consumer.

Figure 4:
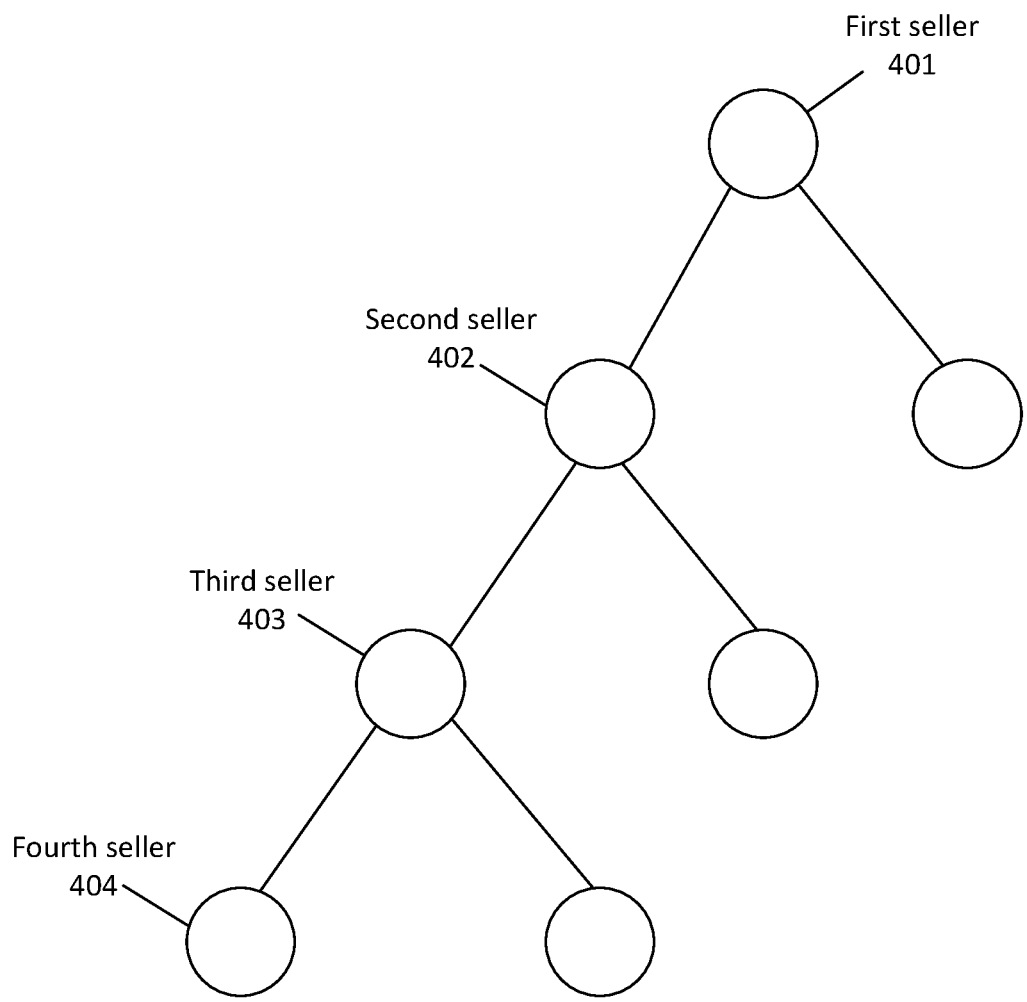
FIG. 4 illustrates an exemplary chain of digital links created by peer-to-peer onboarding.

FIG. 4 illustrates a chain of digital links 400 that is created through an exemplary incentive system for onboarding users in an online marketplace. Each node represents one user and the links show the downstream users that were onboarded by the user. In other words, the children of each node can be viewed as the users that were onboarded by the user represented by the parent node. Thus, in the exemplary diagram, first seller 401 onboarded second seller 402 who onboarded third seller 403 who onboarded fourth seller 404. Each seller may receive a portion of the value from each transaction completed by users onboarded directly by that seller or by sellers who were onboarded by other sellers previously onboarded by the seller, and so on recursively.

Thus, the first seller 401 may receive a portion of the value of each transaction completed by second seller 402, third seller 403, and fourth seller 404, among others. The second seller 402 may receive a portion of the value of each transaction completed by the third seller 403 and the fourth seller 404, among others. The third seller may receive a portion of the value of each transaction completed by the fourth seller 404, among others. The system may transfer a smaller amount of value the farther away a seller is from the seller who completed the transaction. Sellers may receive a higher value from sellers directly onboarded by them, a smaller value from sellers onboarded by those sellers, a smaller value from sellers onboarded by those sellers, and so on. Thus, for example, the first seller would receive the most value from transactions completed by second seller 402, a lesser value from transactions completed by third seller 403, and a lesser value from transactions completed by fourth seller 404. In some embodiments, the amount collected may be indicated by a percentage of transaction value, such as 2% of the value of transactions from the seller that was onboarded. Thus, for example, one system of percentage values that could be used is 2% of the value of transactions from sellers directly onboarded, 1% of the value of transactions from sellers one more link away, 0.5% of the value of transactions from sellers an additional link away, and so on dividing by half for each additional link, where each link is an additional level of indirection. This system of dividing by half at each level creates an infinite series that approaches but does not exceed 4%. Therefore, the maximum payout from each transaction is limited, in this embodiment, to 4% spread across all sellers involved in onboarding the seller who made the transaction.

In an alternative embodiment, a fixed percentage may be applied for transactions from sellers directly onboarded by the seller and the same percentage applied multiplicatively at each level. For example, 2% of the value of transactions from sellers directly onboarded could be collected and transmitted to the onboarding seller, then 2% of 2% from sellers one level away, 2% of 2% of 2% from sellers two levels away, and so on.

In one embodiment, the server stores an indication of when onboarding processes were performed and only transmit a portion of transaction values of onboarded sellers (and sellers onboarded by them and so on down the line) for a limited period of time. Thus, for example, portions of transaction values collected by a second seller that was onboarded by a first seller may only be transmitted to the account of the first seller for a limited period of time, such as one year, six months, three months, or one month.

In some embodiments, a portion of a transaction is only transmitted to other users for some, but not all transactions. For example, the system may segment the transactions so that some have the transaction bonus applied for onboarding and others do not.

Moreover, the system may also implement controls to deal with falsification and fraud. The system may check for falsification of digital images that are used for verification and falsification of the documents shown in those images. The check for falsification may be performed by human workers or an artificial intelligence system. When the system determines that the image or documentation of seller credentials were falsified, the system may impose a penalty on the seller who falsified the image or documentation of the seller credentials. The penalty may be a fine collected from past or future transaction values of the seller that performed the falsification. In some embodiments, the system may impose penalties such as removing a user from the online marketplace, revoking all or a portion of future revenue or all or a portion of past revenue.

In some embodiments, client devices may display statistics to users about how many other users they have onboarded. The client devices may also display how much money the users they have onboarded have generated in transaction value and how much of that was transmitted to the user as an incentive for performing the onboarding. Moreover, the client device may display the full chain of users down the line who were onboarded by other users downstream from the present user, and may display how much money was collected in transaction values from users that are at each level downstream.

The digital links created between users of the online marketplace creates a chain of trust that allows peer-to-peer onboarding of users onto the online marketplace. This enables a more efficient system that does not require the owner of the digital marketplace to verify all users.

By creating incentives for users to onboard other users, the network is incentivized to grow automatically, reducing marketing cost. Moreover, the integrity of the network is protected through the peer-to-peer verification. Further, the online marketplace network can expand to other geographic areas where the owner of the online marketplace does not necessarily have a presence.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A computer-implemented method, the method comprising:
   providing an online marketplace, the online marketplace having sellers and consumers;
   displaying, via a first client device, user interface elements to a first seller prompting the first seller to agree to become an authenticating agent of the owner of the online marketplace;
   receiving, via the first client device, an acceptance from the first seller to become an authenticating agent of the owner of the online marketplace;
   transmitting, via the first client device, a geolocation of the first device, a time information of the first device and the acceptance from the first seller to become an authenticating agent of the owner of the online marketplace to a server;
   displaying, via a second client device, user interface elements to allow a user to request to become a seller on the online marketplace;
   receiving, via the second client device, a request from a second seller to join the online marketplace;
   transmitting, via the second client device, a geolocation of the second client device, time information of the second client device and the request from a second seller to join the online marketplace to a server;
   assigning, via the server, the first seller to onboard and authenticate the second seller to the online marketplace;
   initiating a verification process, via the first client device, to verify the second seller's credentials;
   receiving, at the server, a digital image containing the first seller, second seller, and documentation of the second seller's credentials, the digital image including time information and a geotagged location indicating when and where the digital image was taken;
   verifying, at the server, that the digital image contains the first seller, the second seller, and documentation of the second seller's credentials by comparing the geolocation and the time information of the first client device, the geolocation and the time information of the second client device and the geotagged location and time information of the digital image to determine whether the first seller and second seller were both in the same location of where the digital image was taken;
   adding the second seller to the online marketplace;
   storing, at the server, a digital link between the second seller and the first seller and transmitting a portion of the value of one or more transactions completed by the second seller to an account of the first seller, the digital link including a parent node representing the first seller and a child node representing the second seller; and
   based on digital links stored at the server, displaying, via the first device, a chain of users who were onboarded by other sellers originated from the first seller.

2. The method of claim 1, wherein the documentation of the second seller's credentials is a driver's license or government identification card.

3. The method of claim 1, further comprising:
   adding a third seller to the online marketplace based on an onboarding and authentication by the second seller;
   storing a digital link between the third seller and the second seller and transmitting a portion of the value of one or more transactions completed by the third seller to an account of the second seller, and transmitting a portion of the value of one or more transactions completed by the third seller to an account of the first seller.

4. The method of claim 3, further comprising:
   adding a fourth seller to the online marketplace based on an onboarding and authentication by the third seller;
   storing a digital link between the fourth seller and the third seller and transmitting a portion of the value of one or more transactions completed by the fourth seller to an account of the third seller, transmitting a portion of the value of one or more transactions completed by the fourth seller to an account of the second seller, and transmitting a portion of the value of one or more transactions completed by the fourth seller to an account of the first seller.

5. The method of claim 1, further comprising:
   displaying user interface elements to the second seller that enable selecting a seller to assist with onboarding and authentication.

6. The method of claim 1, wherein the online marketplace provides on-demand ridesharing.

7. The method of claim 1, wherein the online marketplace is a marketplace for services.

8. The method of claim 1, wherein the online marketplace is a marketplace for goods.

9. The method of claim 1, wherein the transmission of a portion of the transaction values of the second seller to the account of the first seller occurs for a limited period of time.

10. The method of claim 1, further comprising:
    checking for falsification of verification images or documentation of seller credentials, and when it is determined that a verification image or documentation of seller credentials has been falsified, penalizing the seller that falsified the image or documentation of seller credentials with a fine on past or future transaction values of said falsifying seller.

11. A non-transitory computer-readable medium, the non-transitory computer-readable medium comprising instructions for:
   providing an online marketplace, the online marketplace having sellers and consumers;
   displaying, via a first client device, user interface elements to a first seller prompting the first seller to agree to become an authenticating agent of the owner of the online marketplace;
   receiving, via the first client device, an acceptance from the first seller to become an authenticating agent of the owner of the online marketplace;
   transmitting, via the first client device, a geolocation of the first device, a time information of the first device and the acceptance from the first seller to become an authenticating agent of the owner of the online marketplace to a server;
   displaying, via a second client device, user interface elements to allow a user to request to become a seller on the online marketplace;
   receiving, via the second client device, a request from a second seller to join the online marketplace;
   transmitting, via the second client device, a geolocation of the second client device, time information of the second client device and the request from a second seller to join the online marketplace to a server;
   assigning, via the server, the first seller to onboard and authenticate the second seller to the online marketplace;
   initiating a verification process, via the first client device, to verify the second seller's credentials;
   receiving, at the server, a digital image containing the first seller, second seller, and documentation of the second seller's credentials, the digital image including time information and a geotagged location indicating when and where the digital image was taken;
   verifying, at the server, that the digital image contains the first seller, the second seller, and documentation of the second seller's credentials by comparing the geolocation and the time information of the first client device, the geolocation and the time information of the second client device and the geotagged location and time information of the digital image to determine whether the first seller and second seller were both in the same location of where the digital image was taken;
   adding the second seller to the online marketplace; and
   storing, at the server, a digital link between the second seller and the first seller and transmitting a portion of the value of one or more transactions completed by the second seller to an account of the first seller, the digital link including a parent node representing the first seller and a child node representing the second seller; and
   based on digital links stored at the server, displaying, via the first device, a chain of users who were onboarded by other sellers originated from the first seller.

12. The non-transitory computer-readable medium of claim 11, wherein the documentation of the second seller's credentials is a driver's license or government identification card.

13. The non-transitory computer-readable medium of claim 11, further comprising instructions for:
   adding a third seller to the online marketplace based on an onboarding and authentication by the second seller;
   storing a digital link between the third seller and the second seller and transmitting a portion of the value of one or more transactions completed by the third seller to an account of the second seller, and transmitting a portion of the value of one or more transactions completed by the third seller to an account of the first seller.

14. The non-transitory computer-readable medium of claim 13, further comprising instructions for:
   adding a fourth seller to the online marketplace based on an onboarding and authentication by the third seller;
   storing a digital link between the fourth seller and the third seller and transmitting a portion of the value of one or more transactions completed by the fourth seller to an account of the third seller, transmitting a portion of the value of one or more transactions completed by the fourth seller to an account of the second seller, and transmitting a portion of the value of one or more transactions completed by the fourth seller to an account of the first seller.

15. The non-transitory computer-readable medium of claim 11, further comprising instructions for:
   displaying user interface elements to the second seller that enable selecting a seller to assist with onboarding and authentication.

16. The non-transitory computer-readable medium of claim 11, wherein the online marketplace provides on-demand ridesharing.

17. The non-transitory computer-readable medium of claim 11, wherein the online marketplace is a marketplace for services.

18. The non-transitory computer-readable medium of claim 11, wherein the online marketplace is a marketplace for goods.

19. The non-transitory computer-readable medium of claim 11, wherein the transmission of a portion of the transaction values of the second seller to the account of the first seller occurs for a limited period of time.

20. The non-transitory computer-readable medium of claim 11, further comprising instructions for:
   checking for falsification of verification images or documentation of seller credentials, and when it is determined that a verification image or documentation of seller credentials has been falsified, penalizing the seller that falsified the image or documentation of seller credentials with a fine on past or future transaction values of said falsifying seller.

\* \* \* \* \*